United States Patent [19]
Murata et al.

[11] Patent Number: 5,856,845
[45] Date of Patent: Jan. 5, 1999

[54] IMAGING DEVICE FOR RECORDING AND REPRODUCING SLOW MOTION PICTURES

[75] Inventors: Haruhiko Murata; Hirokazu Ide, both of Osaka, Japan

[73] Assignee: Sanyo Electric Co., Ltd., Osaka, Japan

[21] Appl. No.: 815,908

[22] Filed: Mar. 12, 1997

Related U.S. Application Data

[63] Continuation of Ser. No. 453,064, May 26, 1995, abandoned, which is a continuation of Ser. No. 188,543, Jan. 28, 1994, abandoned.

[30] Foreign Application Priority Data

| Jan. 28, 1993 | [JP] | Japan | 5-012576 |
| Jan. 28, 1993 | [JP] | Japan | 5-012578 |
| Sep. 13, 1993 | [JP] | Japan | 5-227284 |
| Dec. 3, 1993 | [JP] | Japan | 5-303862 |

[51] Int. Cl.$^6$ .......................... H04N 5/335; H04N 5/235
[52] U.S. Cl. .................... 348/312; 348/230; 348/273; 348/314; 348/317; 386/81
[58] Field of Search .................. 348/311, 312, 348/314, 315, 316, 440, 448, 550, 272, 273, 230, 207, 222, 229, 280, 317, 320, 321, 323, 324; 386/81, 109; H04N 5/335, 5/235

[56] References Cited

U.S. PATENT DOCUMENTS

| 4,685,002 | 8/1987 | Powers ........................ 360/9.1 |
| 4,890,165 | 12/1989 | Hasegawa ...................... 348/312 |
| 4,985,758 | 1/1991 | Hashimoto ..................... 348/283 |
| 5,239,418 | 8/1993 | Tyler et al. ..................... 360/10.3 |

FOREIGN PATENT DOCUMENTS

| 329189 | 12/1990 | European Pat. Off. | ....... H04N 5/335 |
| 6451876 | 2/1989 | Japan | .............. H04N 5/335 |
| 4373276 | 12/1992 | Japan | .............. H04N 5/335 |

OTHER PUBLICATIONS

Hiroyaki Matsumoto, Tetsuo Ando, Yasuo Kanoh, Seisuke Yamanaka and Shigeyuki Ochi, "A Zigzag Transfer CCD Imager" article of 1978 IEEE International Solid–State Circuits Conference, pp. 41–43.

*Primary Examiner*—Wendy Garber
*Assistant Examiner*—Ngoc-Yen Vu
*Attorney, Agent, or Firm*—Pillsbury Madison & Sutro

[57] ABSTRACT

An imaging device has a photosensitive array, a vertical transfer CCD array, a horizontal transfer CCD, a drain region, drain gates, a drive circuit and a processing circuit. An electric charge accumulated in the photosensitive array is first transferred to the vertical transfer CCD array, and then transferred from the vertical transfer CCD array to the horizontal transfer CCD. The electric charge held in the horizontal transfer CCD is transferred to the drain region at a predetermined timing defined by to a slow motion ratio N. The slow motion operation can be changed independently of the frequencies of the CCD drive signals. Therefore, the power consumption is much reduced and a slow motion ratio can be obtained.

4 Claims, 19 Drawing Sheets

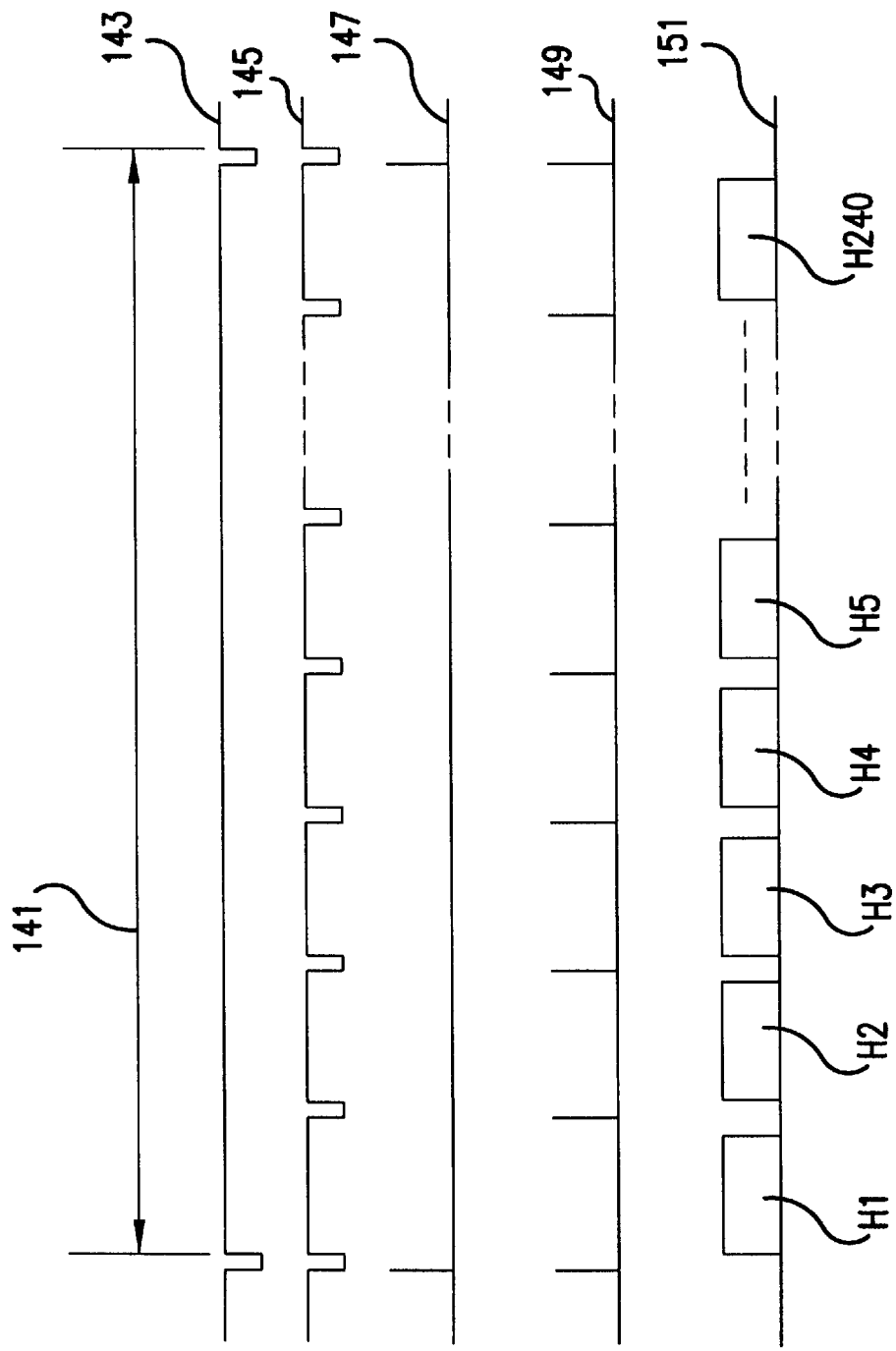

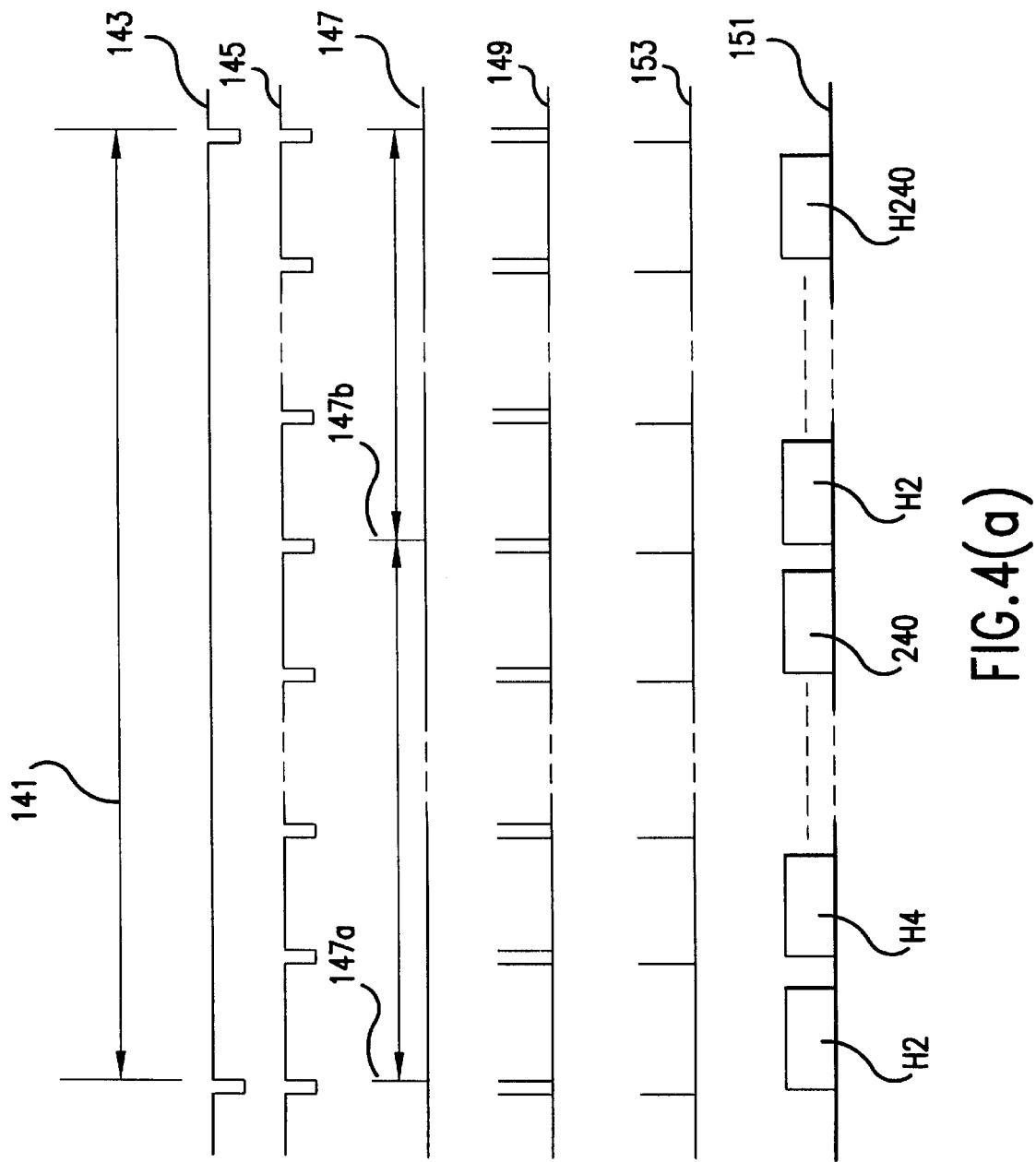

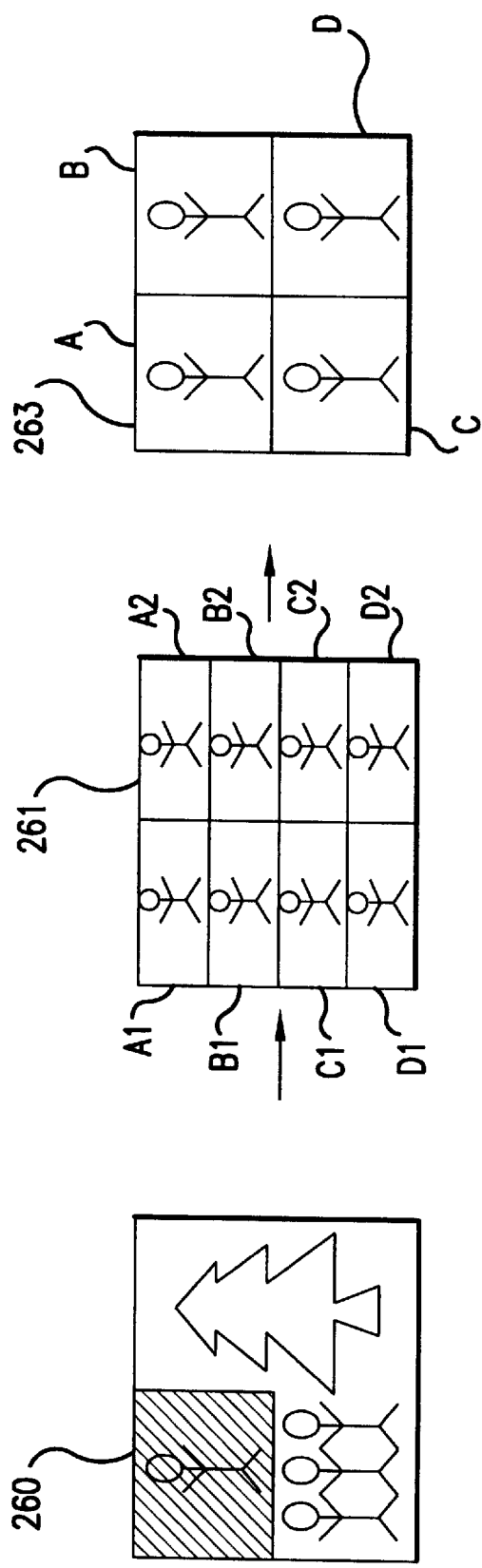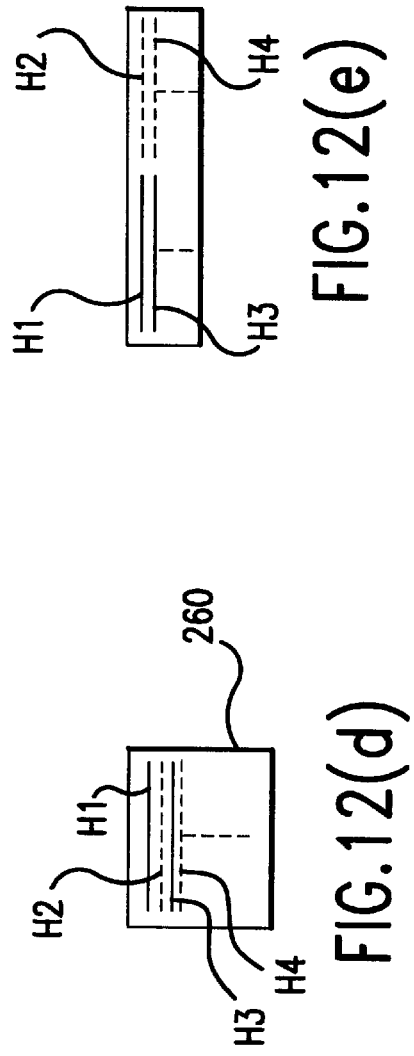

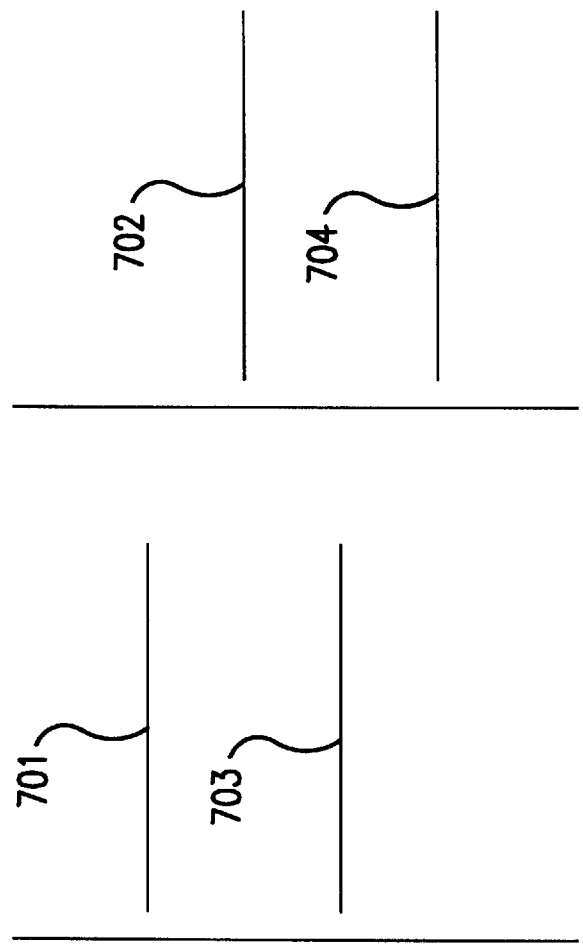

IMAGING DEVICE FOR RECORDING AND REPRODUCING SLOW MOTION PICTURES

This is a continuation of application Ser. No. 08/453,064 filed May 26, 1995, now abandoned, which is a continuation of application Ser. No. 08/188,543, filed Jan. 28, 1994, now abandoned.

FIELD OF THE INVENTION

The present invention relates to an imaging device for recording and reproducing slow motion pictures. More specifically, the present invention relates to an imaging device having a low power consumption and a wide range of slow motion ratio.

BACKGROUND OF THE INVENTION

The prior art, such as, for example, unexamined Japanese Patent Publication HEI 1-51876, describes an imaging device for recording and reproducing slow motion pictures which uses a charge coupled device (CCD). The charge couple device of the Japanese document uses horizontal transfer clock and vertical transfer clock signals which are both N times as fast as the clock signals used for normal operation. As a result, the imaging device provides a video signal which is compressed along the time-axis. The compressed video signal is recorded in a conventional video tape recorder. In a reproducing mode, the compressed video signal is expanded along the time-axis by N times. Therefore, a slow motion picture which is N times slower than the normal operation is achieved.

In the prior art system, to obtain the compressed video signal, the CCD needs to have vertical and horizontal transfer clock signals which are N times faster (in frequency) than the clock signals used for normal operation. As a CCD is essentially a capacitive load device, a higher frequency drive signal, especially the horizontal transfer clock signal, results in higher power consumption.

Further, when the frequency of the drive signal, especially the horizontal transfer clock signal, is higher than a certain level, the efficiency in the transfer operation of the CCD is substantially reduce. This means that image information is lost during a transfer operation of the CCD. As a result, such prior art systems do not provide a high slow motion ratio. The slow motion ratio is defined as the time ratio between the time needed to derive one picture from the CCD in the normal operation mode and the time needed to derive one picture from the CCD in the slow motion mode. For example, if the necessary time in the normal operation mode is 1/60 second and the necessary time in the slow motion mode is 1/120, the slow motion ratio equals two.

SUMMARY OF THE INVENTION

An object of embodiments of the present invention is to provide an imaging device for recording and reproducing slow motion pictures having a low power consumption.

Another object of embodiments of the present invention is to provide an imaging device for recording and reproducing slow motion pictures having a wide range of slow motion ratio.

In accordance with these and other objects, the imaging device comprises a photosensitive array, a vertical transfer CCD array, a horizontal transfer CCD, a drain region, drain gates, a drive circuit and a processing circuit in which an electric charge accumulated in the photosensitive array is first transferred to the vertical transfer CCD array, and then transferred from the vertical transfer CCD array to the horizontal transfer CCD. The electric charge held in the horizontal transfer CCD is transferred to the drain region at a predetermined timing related to a slow motion ratio N.

As a result, it is not necessary for the slow motion operation to change the frequencies of the CCD drive signals. Therefore, the power consumption is substantially reduced in slow motion operation and higher slow motion ratios can be obtained.

BRIEF DESCRIPTION OF THE DRAWINGS

FIG. 3 is a timing chart showing normal motion operation of the present invention.

FIG. 4(a) is a timing chart showing a slow motion operation of the present invention.

FIG. 12(a) to FIG. 12(e) are explanatory views showing operation of the second embodiment of the present invention.

FIG. 16(a) to FIG. 16(c) are explanatory views showing an interlace process of the third embodiment of the present invention.

DETAILED DESCRIPTION OF THE PREFERRED EMBODIMENTS

Imaging device for recording and reproducing slow motion pictures in accordance with several embodiments of the present invention are described below in detail with reference to the drawings.

Figure 1:
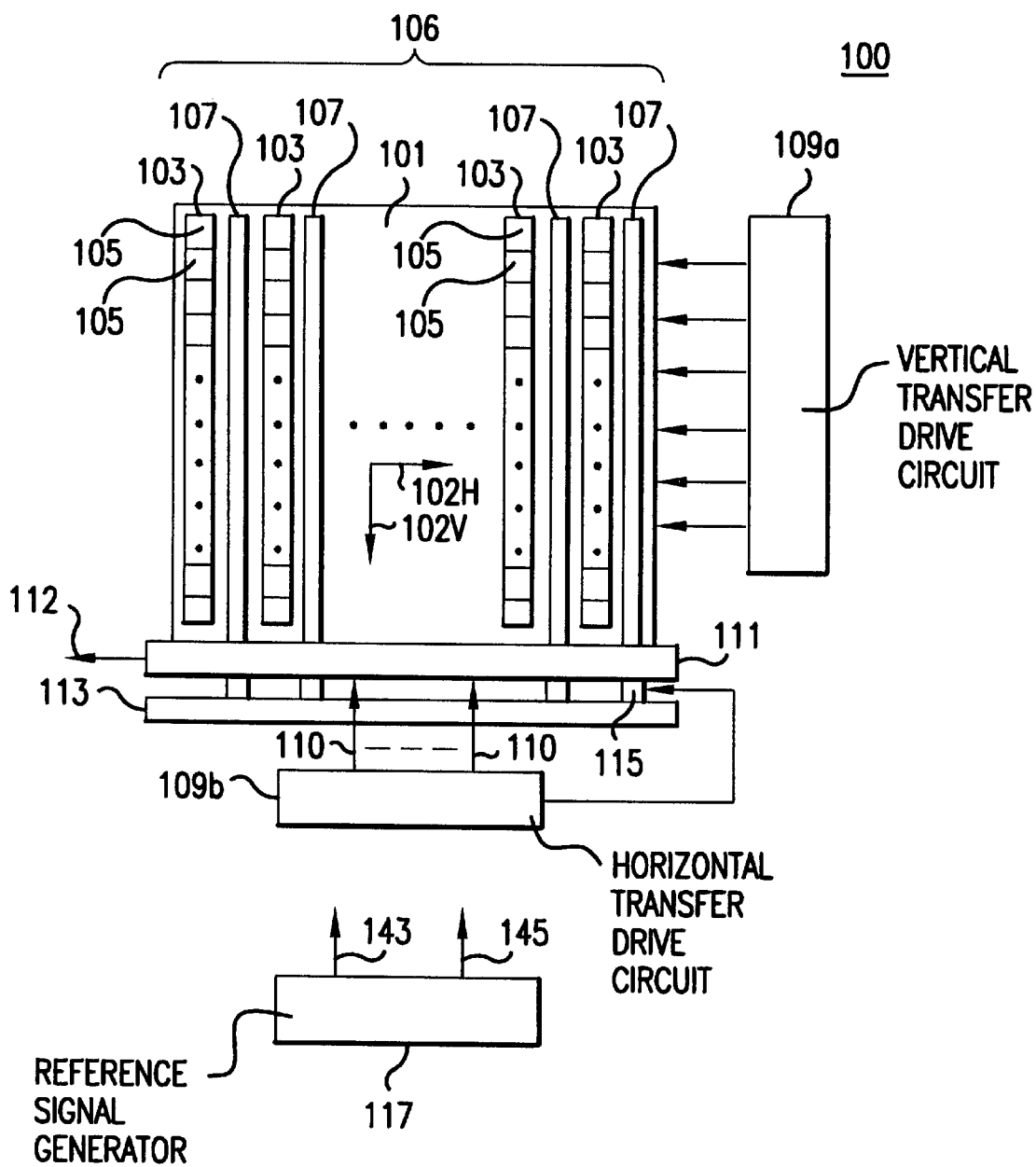
FIG. 1 is an explanatory view showing a structure of an imaging device of a first embodiment of the present invention.

FIG. 1 shows an imaging device 100 in accordance with a first embodiment of the present invention. The imaging device 100 has an imaging surface 101. The imaging surface 101 has a horizontal direction 102H and a vertical direction 102V, the vertical direction 102V being perpendicular to the horizontal direction 102H. On the imaging surface 101, there are illustratively 720 columns 103 of photosensitive cells 105. The columns 103 of photosensitive cells are disposed along the vertical direction 102V. Each column of photosensitive cells has illustratively 240 photosensitive cells 105. Therefore, the imaging device has 172,800 (720*240) photosensitive cells (i.e., picture elements) on the imaging surface 101. In other words, the photosensitive array which has 240 horizontal lines with 720 picture elements in each line.

The imaging device 100 has a vertical transfer CCD array 106. The vertical transfer CCD array 106 has 720 vertical transfer CCDs 107 disposed along the vertical direction 102V. Each vertical transfer CCD 107 has 240 stages each of is adapted to hold electric charge. A vertical transfer CCD 107 is disposed adjacent to an associated column 103 of photosensitive cells. Each photosensitive cell 105 is coupled to a corresponding one of the stages of the vertical transfer CCD 107 disposed adjacent to the column of photosensitive cells. As a result, the electric charge accumulated in each of the photosensitive cell 105 is transferable to the vertical transfer CCD array 106.

A vertical transfer drive circuit 109a controls the operation of the vertical transfer CCD. According to the instruction of the vertical transfer drive circuit 109a, each stage of the vertical transfer CCDs receives the electric charge from the corresponding photosensitive cell 105. The transfer of the electric charge from the photosensitive cells 105 to the stages of the vertical transfer CCDs occurs simultaneously.

The vertical transfer drive circuit 109a also provides a vertical drive signal to the vertical transfer CCD array 106. The vertical drive signal controls charge transfer within the vertical transfer CCD 107 and also controls charge transfer from the vertical transfer CCD 107 to a horizontal transfer CCD 111.

The horizontal transfer CCD 111 has 720 stages, each of which hold electric charge. Each stage of the horizontal transfer CCD 111 has a connection to the last stage of each of the vertical transfer CCD 107. A horizontal transfer drive circuit 109b controls the operation of the horizontal transfer CCD 111. The horizontal transfer drive circuit 109b provides a horizontal drive signal (a horizontal transfer clock signal) 110. In response to the horizontal drive signal, the electric charge held in each stage of the horizontal transfer CCD 111 moves to the next stage and is finally outputted from the horizontal transfer CCD 111 at an output terminal 112.

A reference signal generator 117 provides a vertical synchronous signal 143 and a horizontal synchronous signal 145. These signals are reference signals which are respectively supplied to the drive circuits 109a, 109b.

A drain region 113 is disposed adjacent to the horizontal transfer CCD 111. There are a plurality of drain gates 115. A drain gate 115 is disposed between each stage of the horizontal transfer CCD 111 and the drain region 113. An overflow drain similar to the drain region 113 (but used for a different purpose) is described, for example, in an article "A Zigzag-Transfer CCD Imager" of "1978 IEEE International Solid-State Circuits Conference".

When an optical system (not shown in FIG. 1) focuses an image on the imaging surface 101, each photosensitive cell accumulates an electric charge. The amount of accumulated charge is proportional to the light intensity of the image focused on the photosensitive cell. As noted above, the photosensitive array contains 172,800 (720*240) picture elements associated with the image focused on the imaging surface 101. In other word, the photosensitive array has 240 lines of image data associated with the image focused on the imaging surface 101. Each line of image data contains 720 elements of image data.

Each photosensitive cell accumulates electric charge for the period between transfer operations from the photosensitive array to the vertical transfer CCD array. In other word, the image data associated with the electric charge accumulated in the photosensitive cells represents the image focused on the imaging surface 101 for a period from one transfer operation to next transfer operation.

Figure 2:
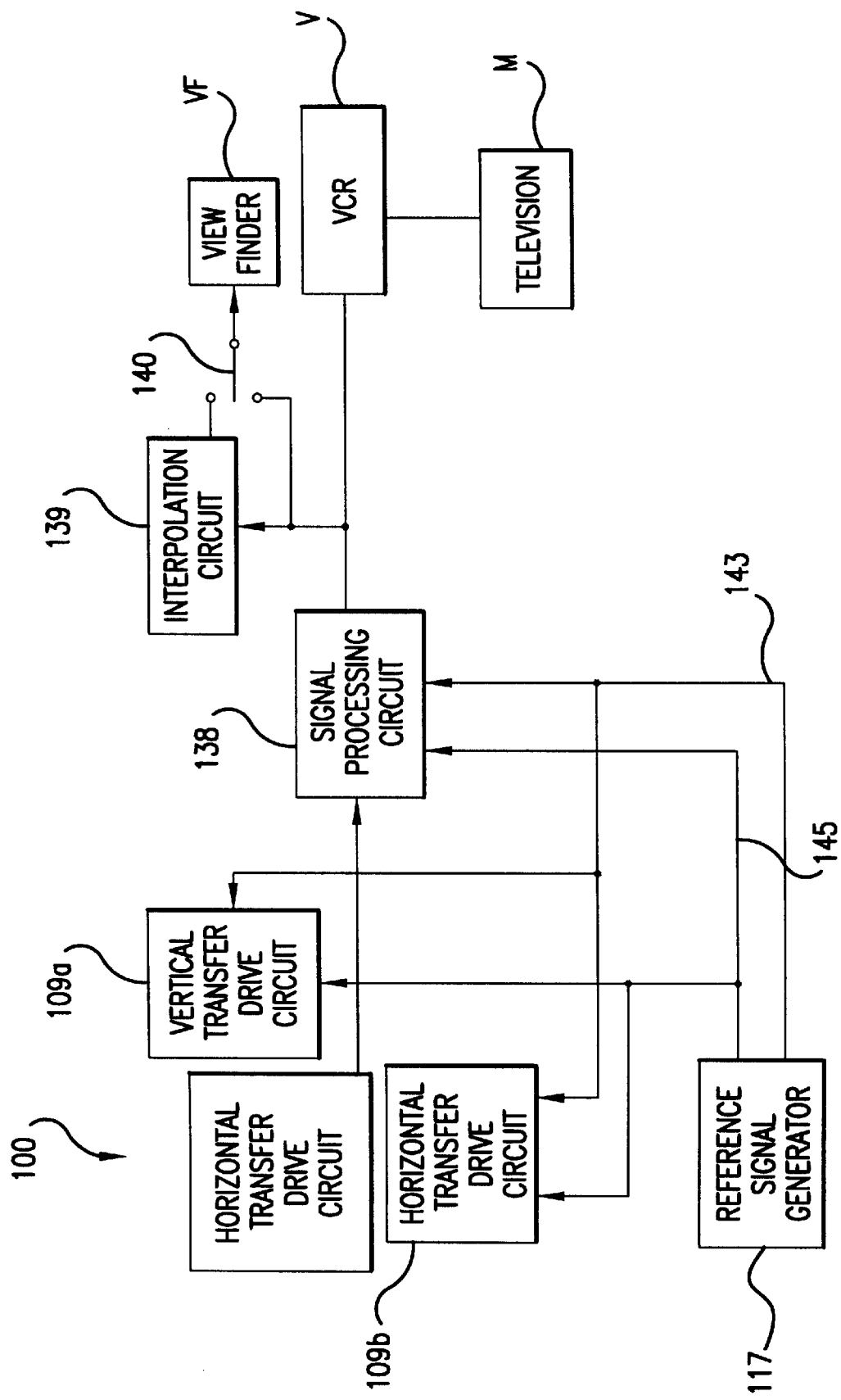
FIG. 2 is a block diagram of the first embodiment of the present invention.

FIG. 2 is a block diagram of an apparatus for recording and reproducing a slow motion picture. The apparatus is illustratively a camcorder in which a video cassette recorder and a video camera are combined. The reference signal generator 117 provides a reference signal to each of the vertical and horizontal drive circuits 109a and 109b. The reference signal generator 117 also provide a vertical synchronous signal 143 and a horizontal synchronous signal 145 to a signal processing circuit 138. The signal processing circuit 138 receives the output of the horizontal transfer CCD 111 (see terminal 112 in FIG. 1) and converts it to a standard video signal such as, for example, a NTSC signal.

An interpolation circuit 139 receives the standard video signal provided by the signal processing circuit 138. The interpolation circuit 139 interpolates the standard video signal from the signal processing circuit 138 in slow motion operation mode. A selecting switch 140 selects either the output of the signal processing circuit 138 or the output of the interpolation circuit 139 and provides the selected signal to a view finder VF. The view finder VF receives the video signal from the signal processing circuit 138 in normal motion operation mode. In slow motion operation mode, the view finder VF receives the output signal from the interpolation circuit 139.

The signal processing circuit 138 also provides the standard video signal to a video cassette recorder (VCR) V. The video cassette recorder is, for example, an 8 mm video recorder and player. The VCR V records the video signal from the signal processing circuit 138 and reproduces a reproducing video signal from a magnetic tape (not shown). The reproducing video signal from the VCR V is provided to a television M.

FIG. 3 is a timing chart of normal operation of the imaging device 100 in one field period 141. The vertical synchronous signal 143 and the horizontal synchronous signal 145 control the operation of the imaging device 100. Each electric charge accumulated in each photosensitive cell 105 moves to the associated stage of the vertical transfer CCD 107 at the timing of a read-out pulse 147 from the vertical transfer drive circuit 109a.

After the transfer of the electric charge from the photosensitive cells to the vertical transfer CCD array 106, a vertical transfer pulse 149, generated during the horizontal blanking period, designates to the vertical transfer CCD 107 to transfer the electric charge stored in an end stage of the vertical transfer CCD 107 into the associated stage of the horizontal transfer CCD 111. Further, the electric charge in each stage of the vertical transfer CCD 107 moves to next stage of the vertical transfer CCD 107.

The horizontal transfer CCD 111 transfers the electric charges held in the stages of the horizontal transfer CCD 111 stage-by-stage in synchronous with the horizontal drive signal 110 from the horizontal drive circuit 109b. The horizontal transfer CCD 111 provides an output signal 151 at the terminal 112. All the electric charges of the horizontal transfer CCD move to terminal 112 in one horizontal period. As a result, all the electric charges accumulated in the each of the photosensitive cells are transferred and used as an output signal of the imaging device in one field period.

Figure 4B:
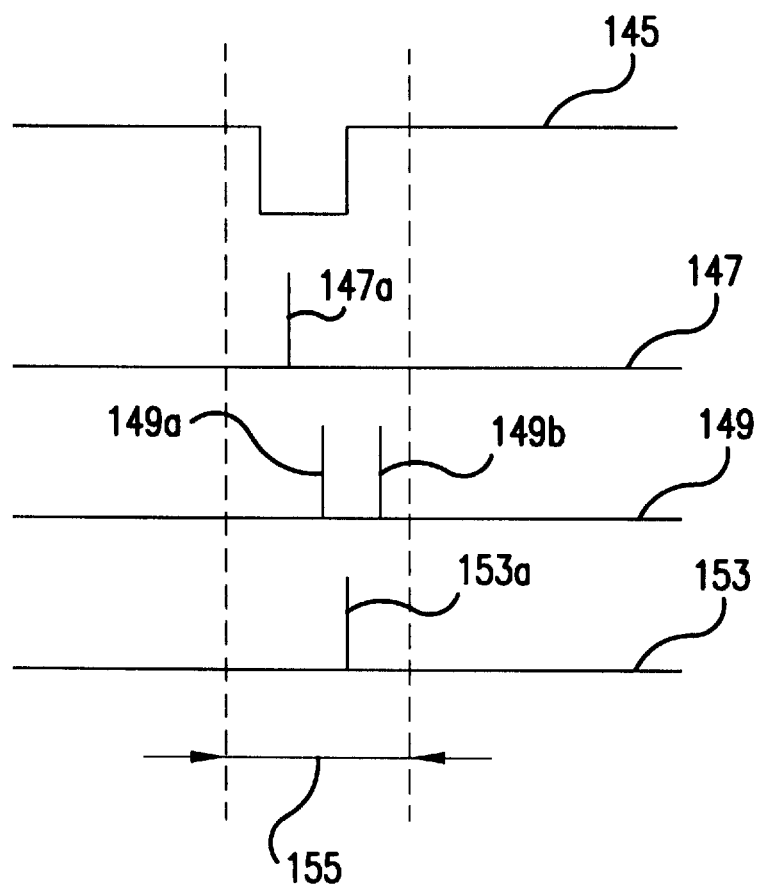
FIG. 4(b) is partially enlarged timing chart of FIG. 4(a).

FIG. 4(*a*) and (*b*) show a two-times slow motion operation of the first embodiment of the present invention, (The slow motion ratio of this mode is equal to two.) In the slow motion operation with a slow motion ratio of two, the read-out operation for transferring the electric charges from the photosensitive cells to the vertical transfer CCD 107 occurs twice in each field period 141. Therefore, the image data from each read-out operation occurs twice as often as normal. For example, in NTSC video, one field period is 1/60 second, whereas in FIG. 4, one field period is 1/120 second. Further, the transfer operation to transfer electric charges from the vertical transfer CCD array 106 to the horizontal transfer CCD 111 occurs twice in one horizontal period.

As best shown in FIG. 4(*b*), after a read-out pulse 147*a*, there occurs a first vertical transfer pulse 149*a*, a drain pulse 153*a* and a second vertical transfer pulse 149*b* in that order. As a result, the electric charge in the horizontal transfer CCD 111, which is transferred at the timing of the first vertical transfer pulse 147*a*, moves to the drain region 113 because of the drain gates 115 opening at timing of the drain pulse 153. Therefore, the electric charge, which is transferred at the timing of the second vertical transfer pulse 149*b*, in the horizontal transfer CCD 111 is used as an output signal.

Consequently, as shown in FIG. 4(*a*), the output signal 153 on the terminal 112 has image data of every other line H2, H4, . . . H240. After finishing the output of the signal of line H240 in response to the first read-out pulse 147*a*, a second read-out pulse 147*b* occurs in a horizontal blanking period. Thereupon, the second transfer in the field period 141 from each photosensitive cell to the vertical transfer CCD array 106 occurs. After the occurrence of the second read-out pulse 147*b*, the image data of every other line H2, H4, . . . , H240, is outputted at the terminal 112, as shown in FIG. 4(*a*).

As described above, although all of the electric charges of the photosensitive cells are transferred to the vertical transfer CCD array 106, only the electric charge corresponding to the image data for every other line is used as the output signal.

Figure 5A:
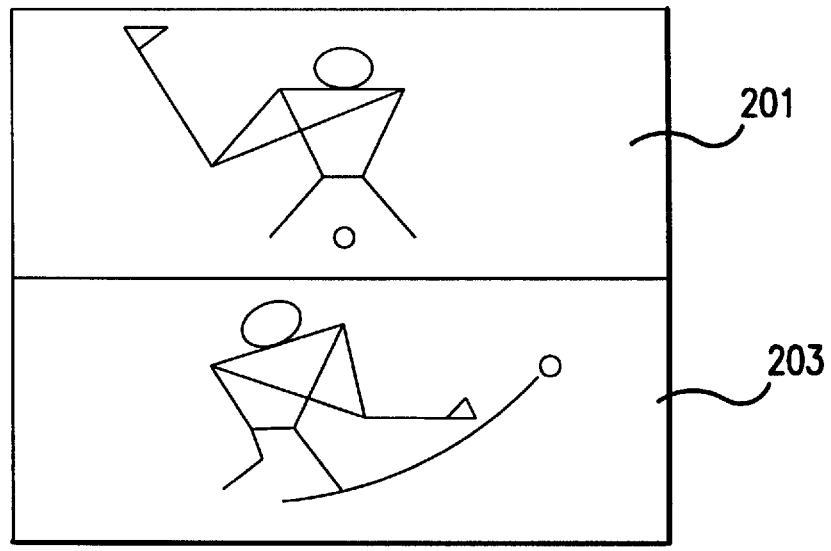
FIG. 5(a) and FIG. 5(b) are explanatory views showing reproduced images in accordance with embodiments of present invention.
Figure 5B:
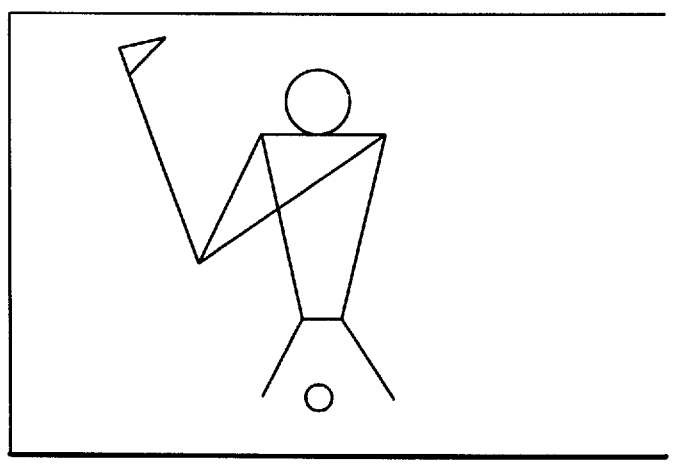

As a result of the read-out operation and the transfer operation described above, one field period 141 has two different pictures, as shown in FIG. 5(*a*). Since one field period of NTSC video signal is 1/60 second, an upper picture 201 and a lower picture respectively represent a half of one field period, i.e, 1/120 second. It should be noted that the frequency of the horizontal drive signal in the slow motion mode is the same as that in the normal operation mode.

In the slow motion mode, the interpolation circuit 139 makes line interpolation to the output signal from the signal processing circuit 138. In the interpolation, an interpolation signal is inserted between two adjacent line signals, such as H2 and H4. To make the interpolation signal, for example, one line signal may be used twice. Alternatively, one line signal and the next line signal, such as H2 and H4, may be averaged. This interpolation expands the scanning time of the upper picture 201 in FIG. 5(*a*) to 1/60 second. As a result, pictures displayed on the view finder VF become as shown in FIG. 5(*b*) and lower picture 203, for example, is not displayed on the view finder VF.

Figure 6A:
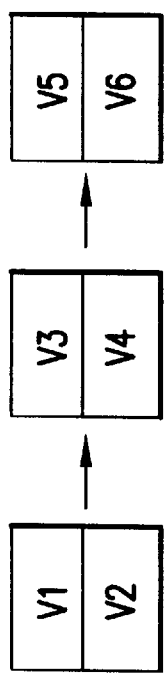
FIG. 6(a) and FIG. 6(b) are explanatory views showing operation of a reproduction mode according to an embodiment of the present invention.
Figure 6B:
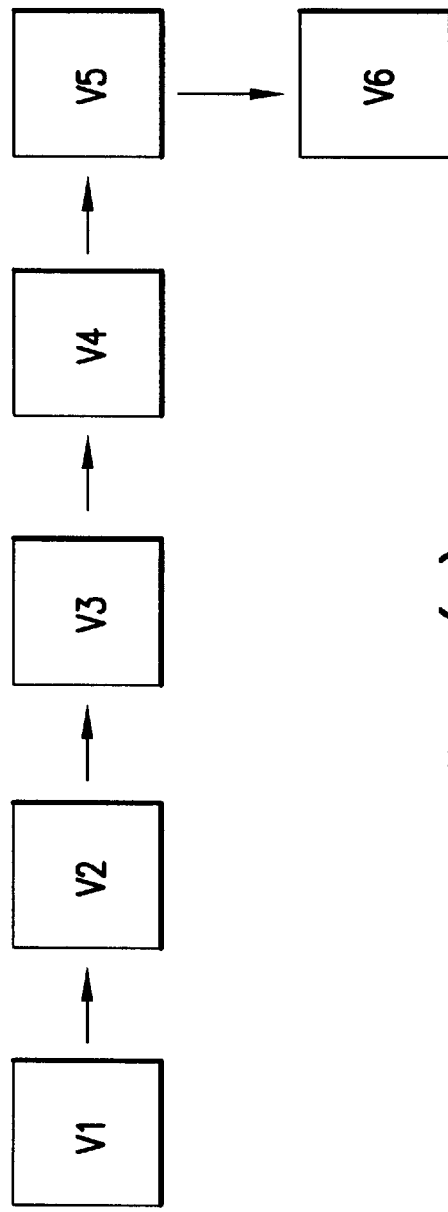

As the VCR V receives the standard video signal from the signal processing circuit 138, the video signal having two pictures, for example V1 and V2, V3 and V4, in the one (normal) field period such as shown FIG. 6(*a*) is recorded by the VCR V in the slow motion mode. The VCR V is a conventional helical scan VCR having at least two rotary heads in which one field of the recording video signal is recorded on one track.

On reproduction of a recorded video signal in slow motion mode, one track having a video signal corresponding to one normal field period (but including two pictures) is preferably traced twice by the rotary heads. Further, the upper picture and lower picture are interpolated and the scanning period become 1/60 second. Therefore, pictures V1, V2,.. V5,.. as shown in FIG. 6(*b*), are displayed on the television receiver M. From FIG. 6(*b*) it is seen that a picture corresponding to 1/120 second such as V1 is displayed in one field period (1/60). As a result, two-time slow motion is achieved.

It is preferable that a pilot signal, which designates slow motion mode, is recorded on the magnetic tape with the video signal so that the reproduction mode of slow motion is started automatically when the pilot signal is detected.

To trace one track including two pictures twice, the magnetic tape may be forwarded intermittently in a manner similar to the conventional intermittent slow motion mode of a VCR.

In the first embodiment of the present invention, a change in the slow motion ratio changes the number of the vertical transfer pulses 149 and drain pulses 153 in the horizontal blanking period 155. For example, in three-times slow motion, there are a first vertical transfer pulse, a first drain pulse, a second vertical transfer pulse, a second drain pulse and a third vertical transfer pulse in each horizontal blanking period. Therefore, every third line of image data is used as the output signal.

Figure 7:
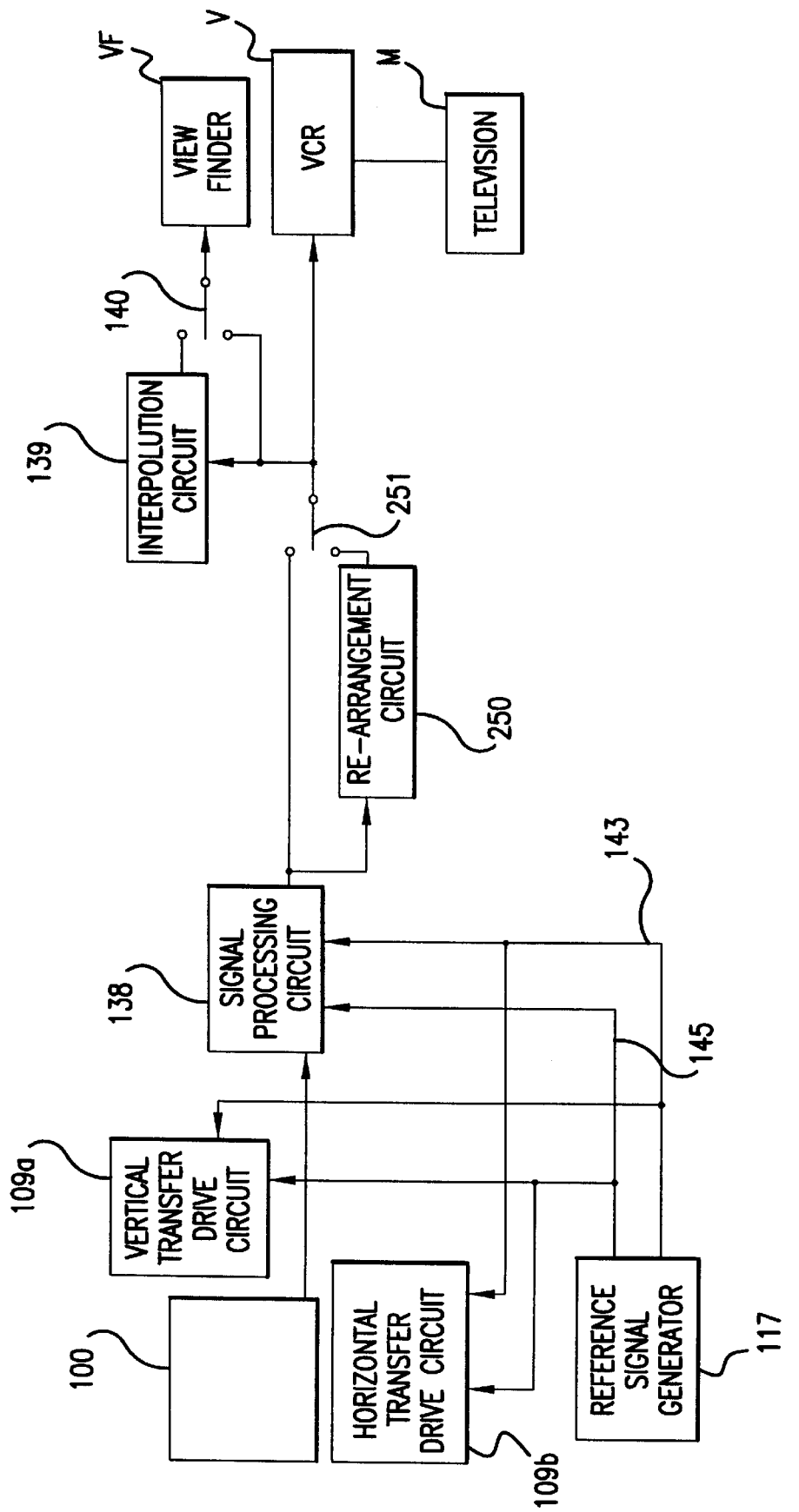
FIG. 7 is a block diagram of a second embodiment of the present invention.

FIG. 7 shows a second embodiment of the present invention. In the second embodiment, there are a re-arrangement circuit 250 and a second selecting switch 251 between the signal processing circuit 138 and the VCR V. Operation of the re-arrangement circuit 250 is described below with reference to FIGS. 9 to 12. Other circuits or devices having the same reference numbers as in FIG. 7 represent the same circuits or devices as shown in FIG. 2.

In the second embodiment, the slow motion ratio is four. This means that the imaging device provides four pictures in one field period. To achieve this process without changing the horizontal transfer clock signal, one forth of the imaging surface (for example, the hatched region in FIG. 12(*a*)) is used. The region 260 contains 360 photosensitive cells in each of 120 lines. As noted above, the entire image surface has 240 lines, with 720 photosensitive cells in each line.

Therefore, as shown in FIG. 8(*a*) and (*b*), a read-out timing pulse 147, a vertical transfer pulse 149, a drain pulse 153 are different from those shown in FIG. 4(*a*) and (*b*). The read-out pulse 147 occurs four times in one field period 141. Therefore, the electric charge accumulated in each photosensitive cell for 1/240 second (one forth of one field period) moves to the vertical transfer CCD array 106.

In FIGS. 8(*a*) and 8(*b*), there are 120 vertical transfer pulses 149*g* (occurring just before the read-out pulse 147), in the horizontal blanking period 155. The drain gates 115 are controlled by the drain pulse 153*b* which is at a high level while the 120 vertical transfer pulses 149*g* occur. As a result, the electric charge from the vertical transfer CCD array 106 is transferred to the horizontal transfer CCD 111 in accordance with the vertical transfer pulses 149*g*. However, such transferred charge is not output from the horizontal transfer CCD 111.

Figure 8A:
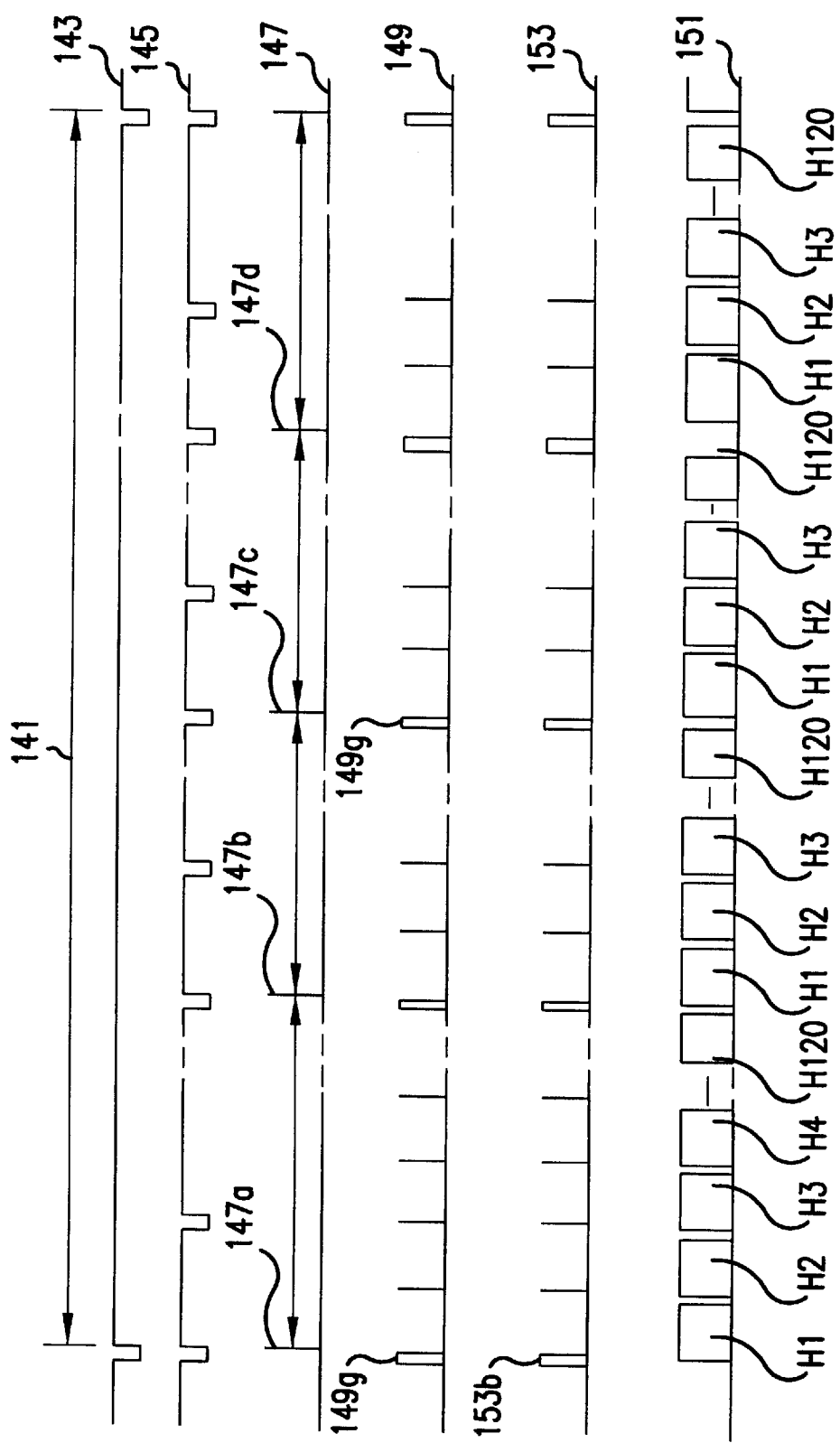
FIG. 8(a) is a timing chart showing a slow motion operation of the second embodiment of the present invention.
Figure 8B:
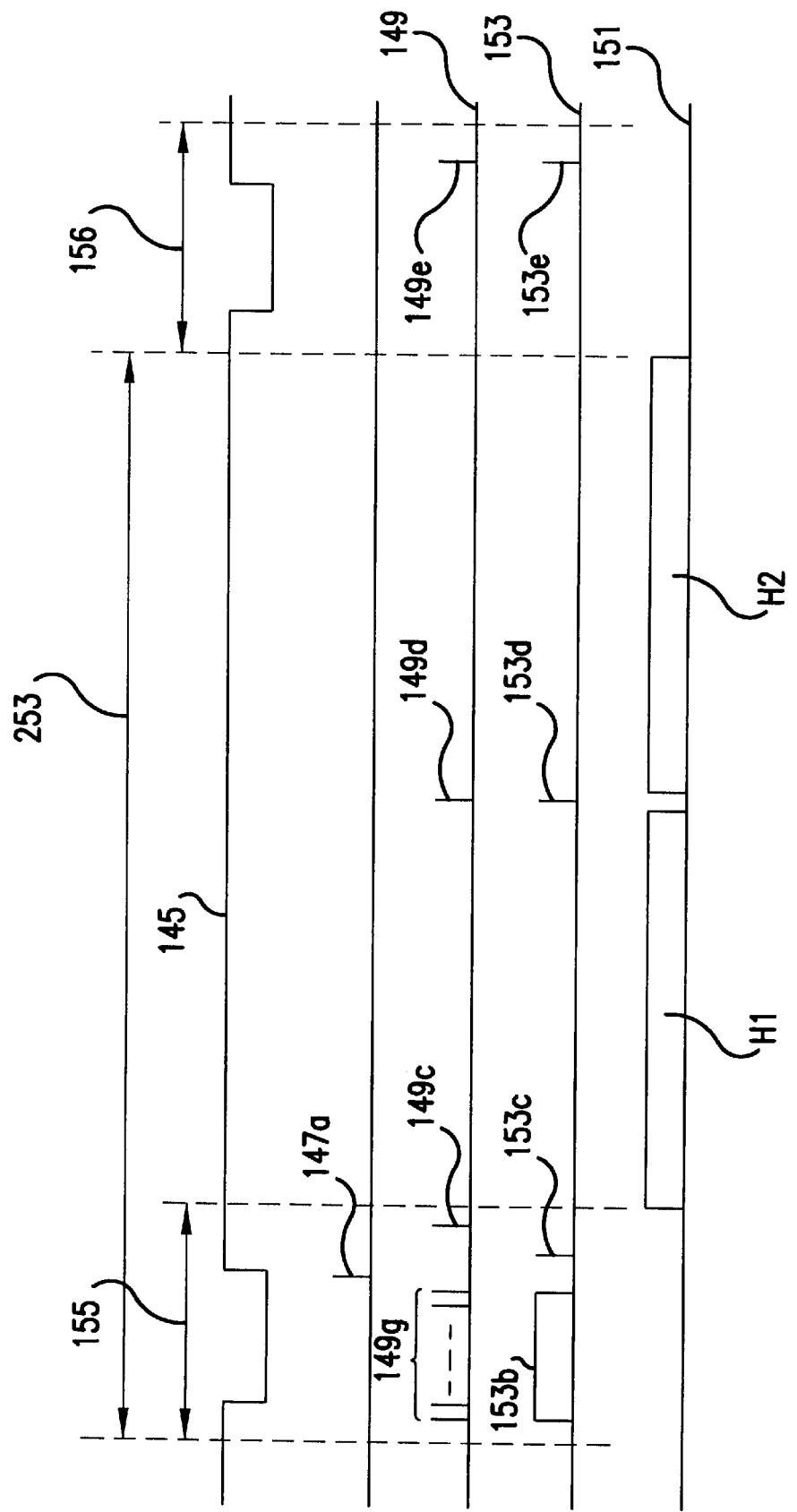
FIG. 8(b) is a partially enlarged timing chart of FIG. 8(a).

After an occurrence of the read-out pulse 147b in FIG. 8(b), an effective vertical transfer pulse 149c occurs, at which time the electric charge from the vertical transfer CCD array 106 is transferred to the horizontal transfer CCD 111. Further, according to the horizontal drive clock signal, electric charge in each stage of the horizontal transfer CCD 111 is transferred to the output terminal 112 as a line signal H1.

Half way through of a transfer operation of the horizontal transfer CCD 111, the drain gate pulse 153d and the vertical transfer pulse 149d occur (in that order). Because of the occurrence of the drain gate pulse 153d, the remaining electric charge transferred at the occurrence of the vertical transfer pulse 149c moves to the drain region 113. Further, the second charge transfer from the vertical transfer CCD array 106 to the horizontal transfer CCD 111 occurs in the horizontal line period 253. Also, the charge transfer in the horizontal transfer CCD starts according to the horizontal transfer clock signal. As a result, the horizontal transfer CCD 111 provides a line signal H2 corresponding to the second line of photosensitive array.

In the next horizontal blanking period 156, the drain gate pulse 153e and the vertical transfer pulse 149e occur in that order. The remaining electric charge in the horizontal transfer CCD moves to the drain region 113. Further the same operation described above is repeated until the next the read-out pulse 147b. As the horizontal transfer clock signal is not provided to the horizontal transfer CCD 111 in the horizontal blanking period 156, the horizontal transfer CCD provides no output signal during the horizontal blanking period.

As described above, the horizontal transfer CCD 111 provides two line signals in one horizontal period, but each line signal contains a first half line associated with the first half of the photosensitive cells 105. Therefore, the output signal from the signal processing circuit 138 shows a picture as shown in FIG. 12(b) if the signal is directly provided to the television apparatus.

The electric charge transfer operation as shown in FIG. 8(a) and (b) changes the signal arrangement from the one shown in FIG. 12(d) to the one shown in FIG. 12(e). In the picture shown in FIG. 12(d), the image data of lines H1 and H2 are disposed in the vertical direction 502V (i.e., H1 is above H2.) The electric charge transfer operation in FIG. 8 disposes the image data of line H2 next to the image data of line H1 along the horizontal direction, as shown in FIG. 12(e). Because of this operation, the picture 261 in FIG. 12(b) contains 8 pictures. The left half is composed from every other odd line (H1, H3, . . . ) and the right half of FIG. 12(b) is composed from every other even line (H2, H4,..).

As described above, the picture 261 in FIG. 12(b) contains 8 pictures, but the picture on the left side is substantially identical to the picture on the right side at the same level, for example A1 and A2. This is the reason that the second embodiment has the re-arrangement circuit 250. The second selecting switch 251 selects an output signal from the re-arrangement circuit 250 in the slow motion mode. After re-arrangement process, the output signal from the re-arrangement circuit 250 contains a picture as shown in FIG. 12(c).

The interpolation circuit 139 in FIG. 7 receives the output signal of the re-arrangement circuit 250. The interpolation circuit 139, which includes a memory which may store signal values of one field picture, selects, for example, a left upper region 263 (FIG. 12(c)) and makes interpolations for the vertical direction and the horizontal direction. These interpolation are made by averaging adjacent signal elements or line signals.

Figure 9:
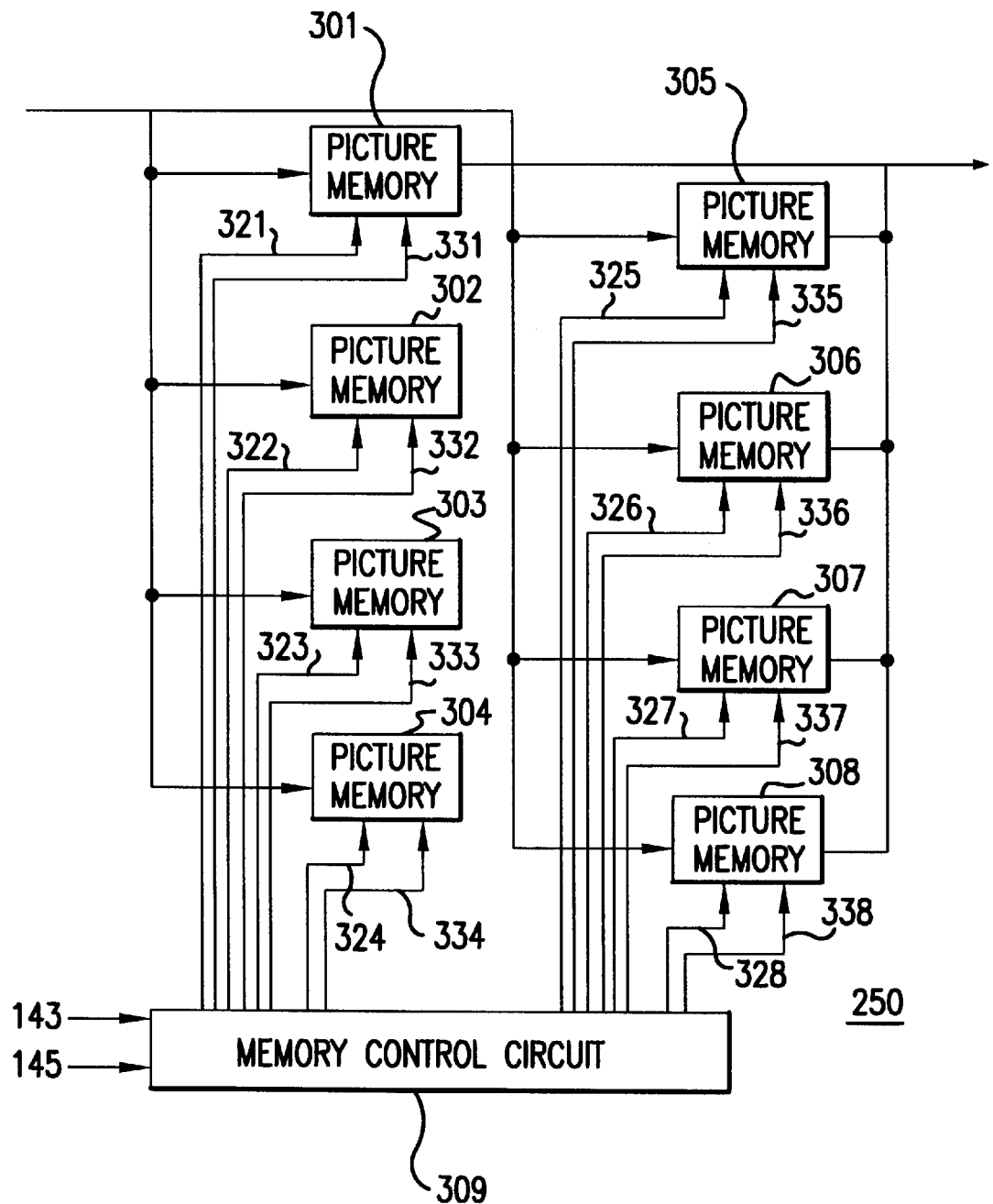
FIG. 9 is a block diagram of a re-arrangement circuit of the second embodiment.

One embodiment of the re-arrangement circuit 250 is shown in FIG. 9. The re-arrangement circuit 250 has a first group of 8 picture memories 301–308 and a second group of 8 picture memories (not shown in FIG. 9). Each memory has the capacity to store at least ⅛ of the image data for one field picture. Each memory 301–308 receives the output signal from the signal processing circuit 138. The picture memory is preferably a digital memory. Therefore, the input signal is converted from an analog signal to a digital signal by a conventional A/D converter (not shown). An output signal is converted from a digital signal to an analog signal by a conventional D/A converter (not shown).

A memory control circuit 309 controls writing and reading operations of each picture memory 301–308 by providing write enable signals and read enable signals. The memory control circuit also controls the second group of 8 memories (not shown in FIG. 9).

The first group of 8 memories and the second group of 8 memories operate complementary. For example, while the first group of 8 memories is in writing mode, the second group of 8 memories is in reading mode. As a result, the re-arrangement circuit 250 can handle the output signal from the signal processing circuit 138 without interruption.

The memory control circuit 309 receives the vertical synchronous signal 143 and the horizontal synchronous signal 145. These two synchronous signals control the timing of the re-arrangement circuit 250.

Figure 10:
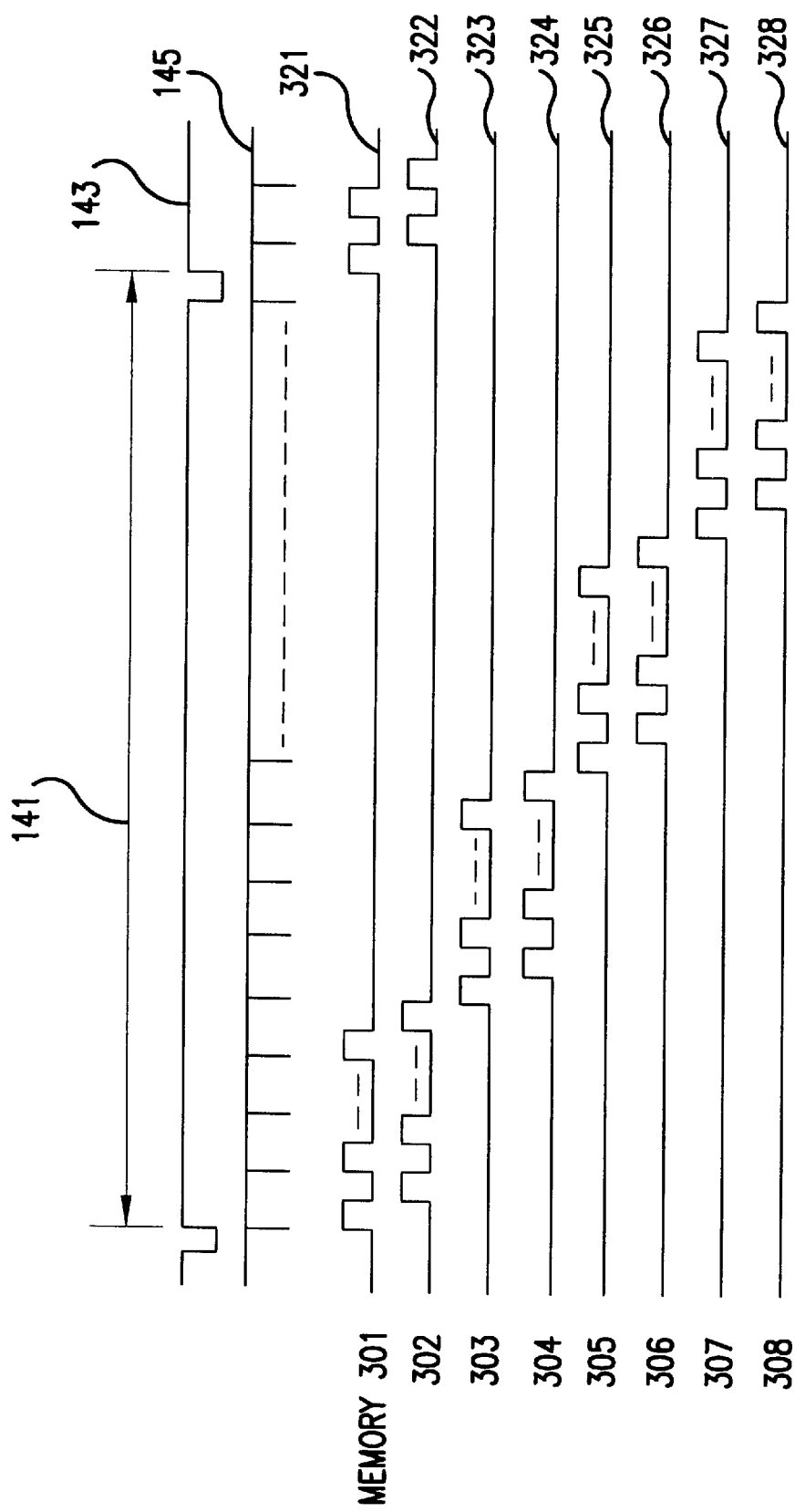
FIG. 10 is a timing chart for a writing mode of the re-arrangement circuit.

In the writing mode of the first group of memories, the memory control circuit 309 provides write enable signals to the picture memories 301–308 as shown in FIG. 10. To the picture memories 301 and 302, the memory control circuit 309 respectively provides write enable signal 321 and 322.

The write enable signal has a high level portion and a low level portion. On the high level portion of the write enable signal, each picture memory effectively receives and stores the output signal from the signal processing circuit 138. The write enable signals 321 and 322 are complementary signals (in other words, these signal are 180 degree out of phase) having a frequency which is the same as the horizontal synchronous signal 145 for the first quarter of one field period 141. Therefore, the picture memory 301 stores a picture A1 in FIG. 12(b) and the picture memory 302 stores a picture A2 in FIG. 12(b).

Further, write enable signals 323, 324, 325, 326, 327 and 328 are respectively provided to the picture memory 303, 304, 305, 306, 307 and 308. As a result, the picture memories 303, 304, 305, 306, 307 and 308 respectively contain the signal of the picture B1, B2, C1, C2, D1 and D2 at the end of this field period 141.

Figure 11:
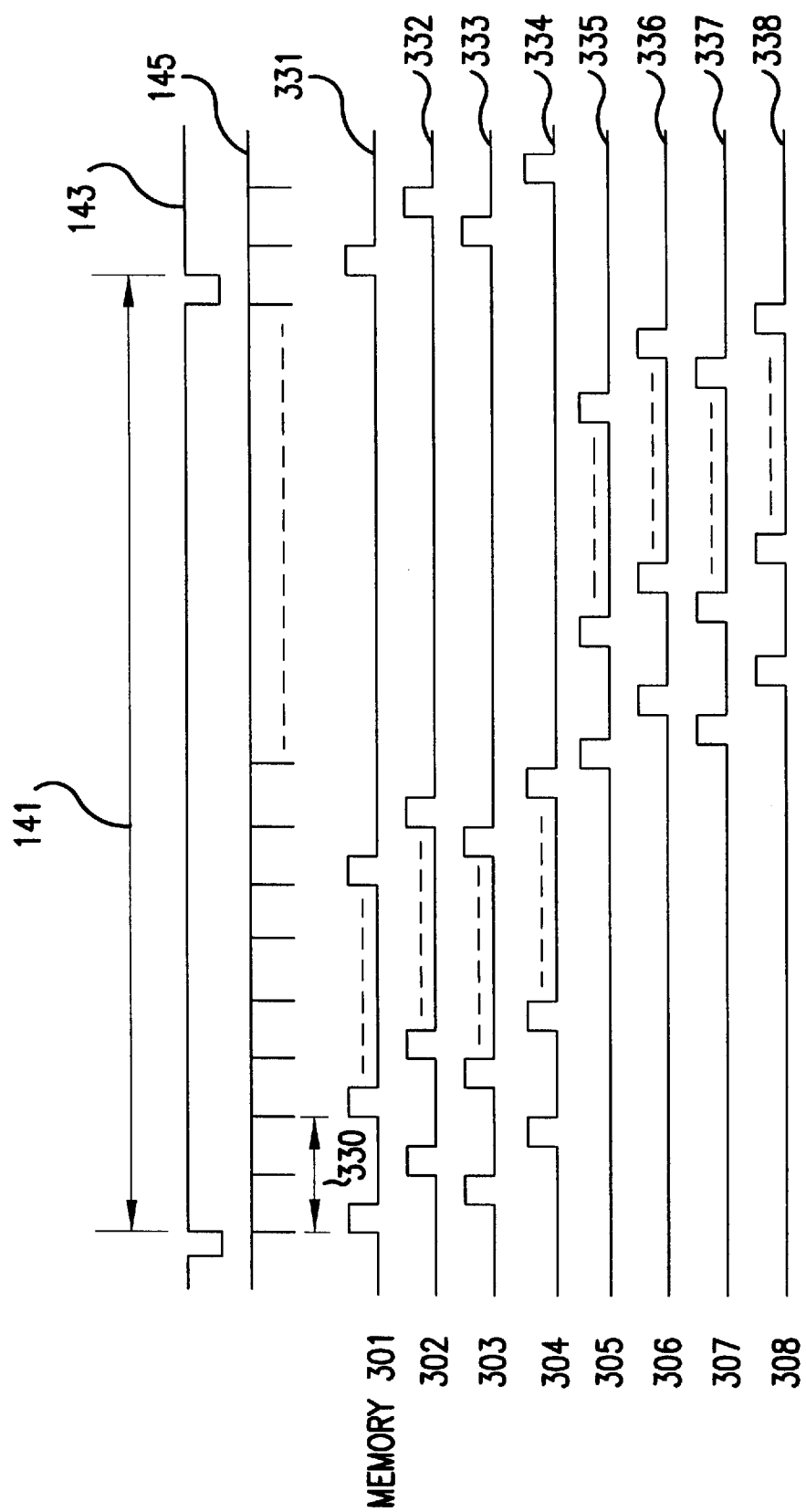
FIG. 11 is a timing chart for a reading mode of the re-arrangement circuit.

In the next field, the operation mode of the first and second group of memories changes to the opposite mode. That is the writing mode changes into the reading mode. In the reading mode, the memory control circuit 309 provides read enable signals to the picture memories 301–308 as shown in FIG. 11. As to the picture memory 301, 302, 303 and 304, the memory control circuit 309 respectively provides read enable signals 331, 332, 333 and 334.

The read enable signal has a high level period and low level period. During the high level of the read enable signal, as shown in FIG. 11, each picture memory provides a read-out signal in the same sequence and same rate as in the writing mode for each picture memory. The read enable signals 331, 332, 333 and 334 have an operation cycle of two horizontal periods 330, as shown in FIG. 11. This cycle is executed in the following order, a high period for a half of one horizontal period in the read enable signal 331, a high period for a half of one horizontal period in the read enable signal 332, a high period for a half of one horizontal period in the read enable signal 333 and a high period for a half of one horizontal period in the read enable signal 334. Therefore, the read-out signal from the picture memory 301, 302, 303 and 304 in the first half of one field period 141 is respectively as follows: one half line from A1, one half line from B1, one half line from A2 and one half line from B2 (A1–B2 are 1/8 pictures as shown in FIG. 12(b)).

During the next half period of one field period 141, the read enable signals 335, 336, 337 and 338 in FIG. 11 are respectively provided to the picture memory 305, 306, 307 and 308. These read enable signals have a similar cycle as described above. As a result, the read-out signal from the picture memory 305, 306, 307 and 308 in the second half of one field period 141 is respectively as follows, one half line from C1, one half line from D1, one half line from C2 and one half line from D2.

As a result of the re-arrangement operation, the output signal of the re-arrangement circuit 250 contains a picture as shown in FIG. 12(c). Further, the VCR V records the output signal of the re-arrangement circuit 250.

In the reproducing operation of the magnetic tape recorded in the slow motion mode, the tape is moved intermittently and, one record track which contains one field signal is traced four times. Further, each 1/4 picture of one field is interpolated in a vertical direction and a horizontal direction in a manner similar to that done by the interpolation circuit for view finder VF. In this case, however, every 4 pictures, for example, A, B, C and D in FIG. 12(c), are subjected to such an interpolation process. As it is necessary for one field period to display one of four 1/4 pictures, for example, picture A in FIG. 12(c) after interpolation, it takes four field periods to display 4 pictures A, B, C and D after interpolation. This is why one track is traced four times by the magnetic heads.

As each picture A, B, C and D is a picture of 1/240 second period and each picture is displayed for 1/60 second, a four-time slow motion is achieved.

In the second embodiment of the present invention, the change in the slow ratio N results in changes in the region on the imaging surface from which the output signal of the imaging device is derived. For example, in a 6 times-slow motion mode, 1/6 of the area of the imaging device (the lines in the horizontal direction divided by two and the lines in the vertical direction divided by three; or vice versa) is used to generate an output signal.

Further, the image data from 1/6 of the area of the imaging device is derived in 1/6 period of one field period 141. This image data derivation is repeated six times in one field period 141.

To achieve such an image data derivation, there are six read-out pulses 147 in one field period 141. Further, there is a first predetermined number of the vertical transfer pulses 149 and drain gate pulse 153 in one horizontal period 253. The first predetermined number is associated with division number of the horizontal direction of 1/6 of the area. If the division number of the horizontal direction equals two, the first predetermined number is two. If the division number of the horizontal direction equals three, the first predetermined number is three.

Further, there are a second predetermined number of vertical transfer pulses in the horizontal blanking period 155 before each read-out pulse. The second predetermined number relates to a division number of the vertical direction of 1/6 of the area. If the division number of the vertical direction of 1/6 of the area is three, the second predetermined number is 160 (2/3 of total line number 240). If the division number of the vertical direction of 1/6 of the area is two, the second predetermined number is 120 (1/2 of total line number).

It is noted that as the slow motion ratio increases, the amount of interpolation increases in the first and the second embodiment of the present invention. In the second embodiment, it is possible to decide division numbers of horizontal direction and vertical direction with respect to the slow motion ratio N, if the slow ratio N is not a prime number such as, for example, 2, 3, 5, 7. For example, two for horizontal direction and three for vertical direction in the six time slow motion. Therefore, it is preferable to balance a division number of the horizontal direction and a division number of the vertical direction. As a result, a slow motion picture generated in the second embodiment is more natural than that in the first embodiment.

FIGS. 13 to 17 relate to a third embodiment of the present invention. In the third embodiment, an imaging device 500 has a different structure in comparison with that of the imaging device 100 of the first and the second embodiments.

The imaging device 500 has an imaging surface 501 which has a horizontal direction 502H and a vertical direction 502V. There are 720 columns of photosensitive cells on the imaging surface 501 along the vertical direction 502V. Each column has 480 photosensitive cells 505. As a result, there is a photosensitive array containing 345,600 (480*720) photosensitive cells. In other words, the photosensitive array has 480 lines, with 720 picture elements in each line.

Figure 13:
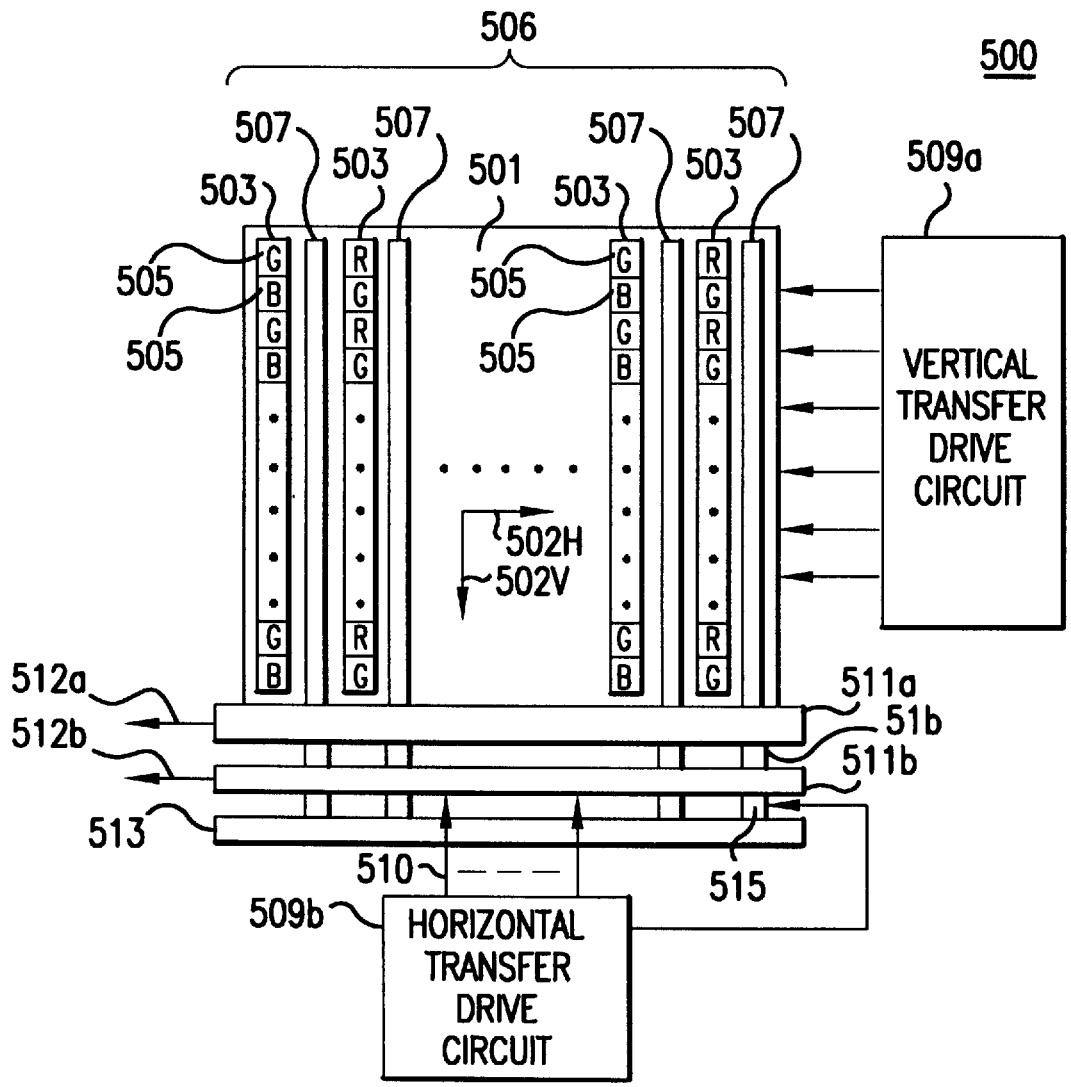
FIG. 13 is an explanatory view showing the structure of an imaging device according to a third embodiment of the present invention.

Each photosensitive cell has a color filter. There are three kinds of color filter, red (R), green (G) and blue (B) which are the three primary colors of light. These filters are disposed in a checkered pattern as shown in FIG. 13. In one embodiment, there are two kinds of lines disposed along the horizontal direction 502H of photosensitive cells with respect to a color filter pattern. These are a line along the horizontal direction 502H with G and R filters being alternatively disposed (G/R line ) and a line along the horizontal direction 502H with B and G filters (B/G line) being alternatively disposed. Further, these two kinds of lines along the horizontal direction 502H of photosensitive cells are alternatively disposed on the imaging surface 501.

Further, there are 720 columns of vertical transfer CCDs 507 on the imaging surface 501. These 720 columns of vertical transfer CCD 507 comprise a vertical transfer CCD array 506. Each column of vertical transfer CCD 507 is disposed adjacent to an associated column of photosensitive cells 503. Each vertical transfer CCD 507 has 480 stages and each stage is associated with one photosensitive cell of one column which is adjacent to the vertical transfer CCD 507. In other word, the vertical transfer CCD array 506 has 480 lines having 720 stages to hold an electric charge. There are charge transfer channels (not shown in FIG. 13) between each photosensitive cell and each stage associated therewith.

A vertical transfer drive circuit 509a controls electric charge transfer from the photosensitive cells 505 to the vertical transfer CCD array 506 and electric charge transfer within the vertical transfer CCD 507.

A first horizontal transfer CCD 511a and a second horizontal transfer CCD 511b are disposed along the horizontal direction 502H of the imaging surface 501. Each horizontal transfer CCD 511a and 511b has 720 stages to hold and to transfer electric charge. Each stage of the first horizontal transfer CCD 511a is coupled to one of the stages of the vertical transfer CCD array 506.

There are 720 transfer gates 516 between the first and the second horizontal transfer CCDs 511a and 511b to transfer an electric charge from each stage of the first horizontal transfer CCD 511a to an associated stage of the second transfer CCD 511b. In this arrangement, for example, the first horizontal transfer CCD 511a provides an output signal associated with the G/R line and the second horizontal transfer CCD 511b provides an output signal associated with the B/G line, as described below.

A drain region 513 is disposed adjacent to the second horizontal transfer CCD 511b. Further, there are 720 drain gates 515 between the second horizontal transfer CCD 511b and the drain region 513 to transfer an electric charge from each stage of the second horizontal transfer CCD 511b to the drain region 513. The electric charge held in each stage of the first horizontal transfer CCD 511a can be transferred to the drain region 513 through the second horizontal transfer CCD 511b. In other word, the electric charge on the first horizontal transfer CCD 511a is first transferred to the second horizontal transfer CCD 511b and then to the drain region 513.

A horizontal drive circuit 509b controls the first and the second horizontal transfer CCDs 512a, 512b. The transfer gates 516 are controlled by the vertical drive circuit 509a.

The electric charge accumulated in each photosensitive cell 505 in each column is first transferred to an associated stage of each vertical transfer CCD 507 (a read-out operation). As a result, all of the electric charges in the photosensitive cell are simultaneously transferred to the vertical transfer array 506. The electric charges stored in the stages of the vertical transfer CCD 507 are transferred to the first horizontal transfer CCD 511a and the second horizontal transfer CCD 511b row-by-row in response to a vertical transfer pulse provided by the vertical drive circuit 509a.

The charge transfer from the vertical transfer CCDs array 506 to the first and the second horizontal transfer CCD 511a and 511b is achieved by two stages of the each vertical transfer CCD 507. To achieve this operation, the electric charges in the last stages of the vertical transfer CCDs 507 are first transferred to the first horizontal transfer CCD 511a and then to the second horizontal transfer CCD 511b through the transfer gates 516.

After the transfer of electric charge from the vertical transfer array 506 to the first and second horizontal transfer CCDs 511a and 511b, the horizontal transfer operation starts in response to the horizontal drive signal from the horizontal drive circuit 509b. Electric charge transfer in the first and second horizontal transfer CCDs 511a and 511b occurs independently from each other and at the same time. An output signal associated with the G/R line of photosensitive cells is provided from the output terminal 512a. Similarly, an output signal associated with the B/G line of photosensitive cells is provided from the output terminal 512b. When the electric charge transfer in the first and the second horizontal transfer CCDs is finished, the electric charges held in the next stage of the vertical transfer CCD array 506 are transferred to the first and second transfer CCDs 511a and 511b. When all the electric charge in the vertical transfer CCD array 506 are transferred through the horizontal transfer CCD 511a and 511b, a new read-out and transfer cycle starts.

Figure 14:
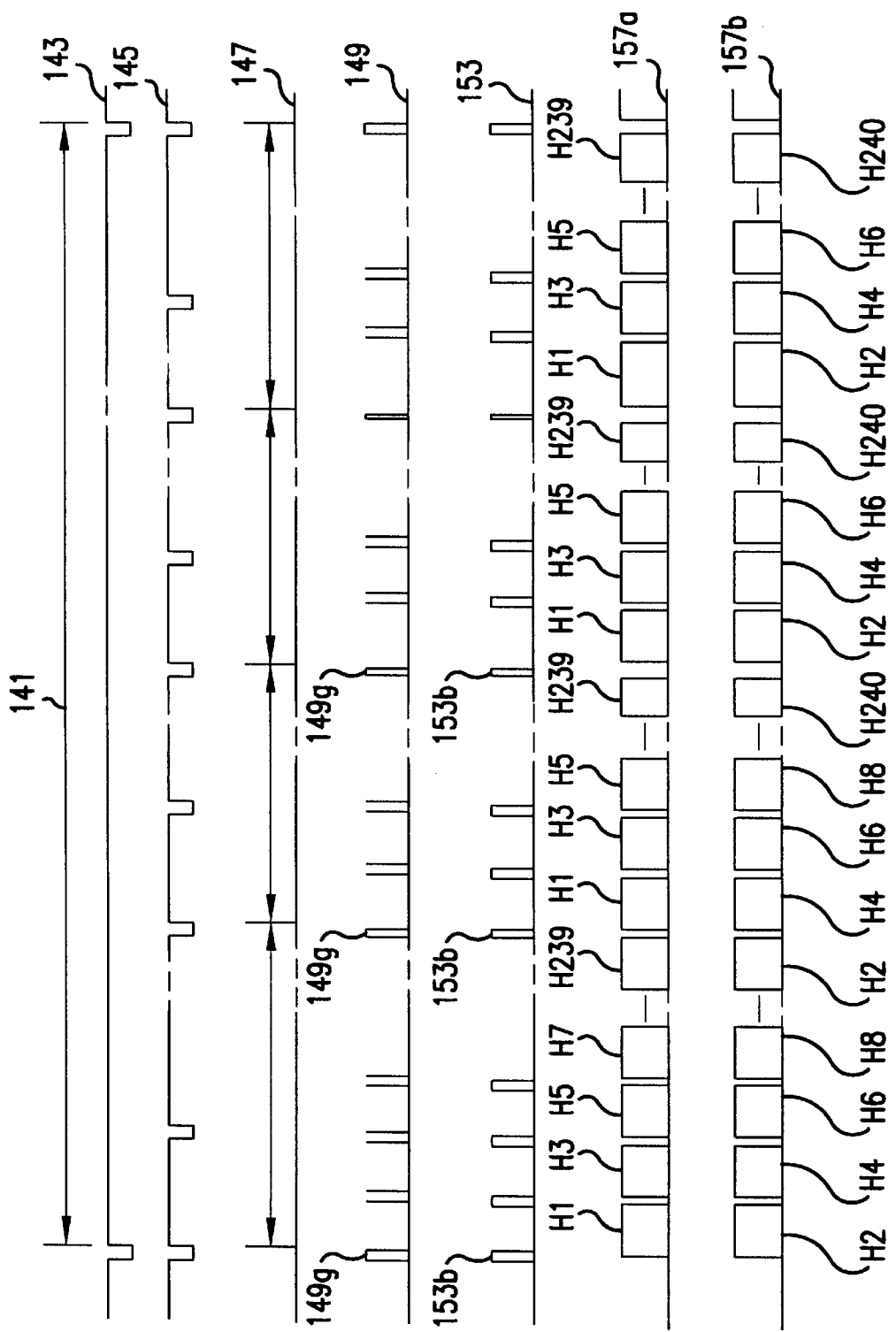
FIG. 14 is a timing chart showing the operation of the third embodiment of the present invention.

FIG. 14 shows a timing chart for four-times slow motion, in accordance with the third embodiment of the present invention. In the slow motion mode of the third embodiment, the operation of imaging device 500 is similar to the operation of the second embodiment as described above with reference to FIGS. 9(a) and (b). Four read-out pulses 147 occur during one field period 141. The vertical transfer of the electric charge occurs twice in one horizontal period. As it is necessary that electric charge is transferred to the first and the second horizontal transfer CCDs 511a and 511b, two successive vertical transfer pulses 149 are applied in a predetermined period.

Before the application of each set of the two vertical transfer pulses 149, a drain pulse 153 having a predetermined width at high level is provided to open the drain gates 515. As a result, the electric charge remaining in the second horizontal transfer CCD 511b is discharged to the drain region 513. A first of the two vertical transfer pulses 149 is then applied during the application of the drain pulse. This results in a one stage shift of the electric charges in the vertical transfer CCDs 507 and the transfer of the electric charges from the first horizontal transfer CCD 511a to the second horizontal transfer CCD 511b.

Since the drain gates are open because the drain pulse is still at high level, the electric charge transferred from the first horizontal transfer CCD 511a is transferred to the drain region 513. At the same time, the electric charge is transferred from the vertical transfer CCD array 506 to the first horizontal transfer CCD. After finishing the high level period (corresponding to the drain gates 515 open period), the second of the vertical transfer pulses occurs. Therefore, the electric charges in two lines of the vertical transfer CCD are transferred to the first and second horizontal transfer CCDs 511a and 511b.

Further, a predetermined number of the vertical transfer pulse 149 and the drain pulses 153 are provided to transfer the electric charge remaining in the vertical transfer CCD array 506 to the first and the second transfer CCDs and to the drain region 513.

As a result, an output signal 157a of the first horizontal transfer CCD 511a and an output signal 157b of the second horizontal transfer CCD 511b are respectively provided (from output terminals 512a and 512b) as shown in FIG. 14. The output signal of the first horizontal transfer CCD 511a contains a signal representing half of the odd lines (H1, H3, . . . , H239) of the photosensitive cells. For example, H1 in FIG. 14 contains a signal representing the first half of photosensitive cells in the first line of photosensitive cells. Further, the output signal of the first horizontal transfer CCD 511a represents, for example, the G/R line.

The output signal of the second horizontal transfer CCD 511b contains a signal representing half of the even lines (H2, H4, . . . , H240) of the photosensitive cells. For example, H2 in FIG. 14 contains a signal representing the first half number of photosensitive cells in the second line of photosensitive cells. Further, the output signal of the second transfer CCD 511b represents, for example, the B/G line.

Figure 15:
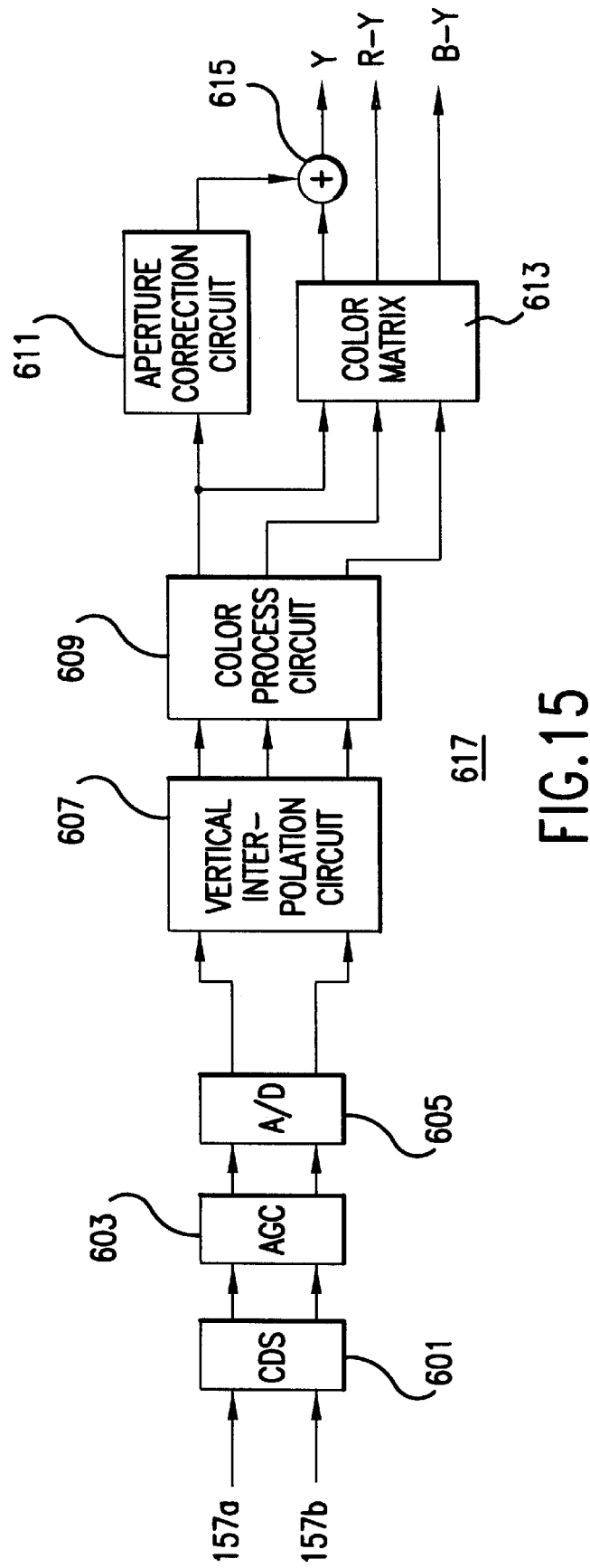
FIG. 15 is a block diagram of a signal processing circuit of the third embodiment of the present invention.

FIG. 15 shows a circuit structure for the signal processing circuit 138 in FIG. 7 according to the third embodiment of the present invention. The output signals 157a and 157b from the output terminals 512a and 512b are provided to a correlation double sampling (CDS) circuit 601. An AGC circuit 603 keeps the amplitude of this signals constant, and an A/D converter 605 converts these signals to digital signals. A vertical interpolation circuit 607 acts as a select circuit to achieve field interlace. A color process circuit 609 receives a signal selected by the vertical interpolation circuit 607 and provides three kinds of color signal such as red (R), green (G) and blue (B).

An aperture correction circuit 611 receives a G signal from the color process circuit 609 and provides a high frequency components of the G signal. A color matrix 613 receives three kinds of color (R, G, B) signals from the color process circuit 609 and provides a luminance signal (Y), an (R-Y) color difference signal and a (B-Y) color difference signal. An adding circuit 615 receives the Y signal and the high frequency component of G signal and provides an aperture corrected Y signal. An NTSC signal, an output signal from the signal processing circuit 617, is generated from the corrected Y signal, the (R-Y) signal, the (B-Y) signal and the horizontal and the vertical synchronous signal (not shown). The NTSC signal from the signal processing circuit 617 is processed in the same manner as the second embodiment.

The vertical interpolation circuit 607 comprises a delay circuit having a predetermined time delay and select switches. The field interlace is achieved by selecting an output signal to be applied the color process circuit 609 according to an odd field or an even field of the NTSC signal.

FIGS. 16(a) to 16(c) show a relation between a disposition of photosensitive cells with color filters and the output signal 157a and 157b. In the odd field, signals H1 and H2 are provided from the vertical interpolation circuit 607 simultaneously. Then signals H3 and H4 are provided at the same time. As the color process circuit 609 receives H1 and H2, or H3 and H4, and processes these signals, a color signal associated with an imaginary scanning line 701 or 703 on the imaging surface 101 is provided from the color process circuit 609, as shown in FIG. 16(b). The imaginary scanning line, for example, 701 is a imaginary line disposed between two lines of the photosensitive array associated with H1 and H2 signal In the even field, the vertical interpolation circuit 607 selects H2 and H3 at the same time, then selects H4 and H5 at the same time. Therefore, a color signal associated with an imaginary scanning line 702 or 704 is provided from the color process circuit 609 as shown in FIG. 16(c). Since H2 and H3, for example, are not provided at the same time from the horizontal transfer CCD 511a and 511b as shown in FIG. 14, the vertical interpolation circuit has delay circuits.

As described above and as illustratively shown in FIG. 16(b) and (c), the imaginary scanning line 703 in the odd field is disposed between the imaginary scanning line 702 and 704. Therefore, field interlace is achieved.

Figure 17C:
FIG. 17(a) to FIG. 17(d) are explanatory views showing a color process of the third embodiment of the present invention.
Figure 17B:
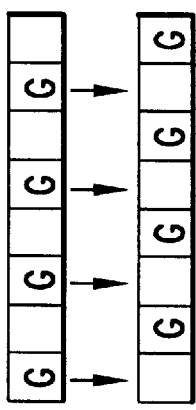
Figure 17D:
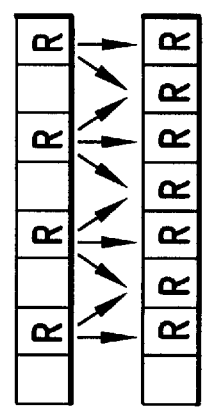
Figure 17A:
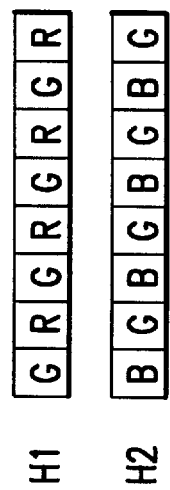

The color process circuit 609 achieves processes as shown in FIG. 17(a) to (d). Assume the color process circuit 609 receives signals as shown in FIG. 17(a). As to the G signal, the color process circuit 609 extracts G signal from one line signal H1 and also the other line signal H2, as shown in FIG. 17(b). Further, the color process circuit 609 combines these two G signals to provide a series of continuous G signal as shown in FIG. 17(c). As to the R or B signals, the color process circuit 609 also extracts, for example, R signal from the one line signal H1. Then, the color process circuit 609 interpolates by a method such as, for example, averaging adjacent two signal, as shown in FIG. 17(d).

What is claimed is:

1. An imaging device for recording slow motion pictures, comprising:

an imaging surface having a vertical direction and a horizontal direction perpendicular to the vertical direction;

a photosensitive array having a plurality of columns of photosensitive cells, each of the columns of photosensitive cells being disposed along the vertical direction on the imaging surface;

a vertical transfer CCD array having a plurality of columns of vertical transfer CCDs, each of the vertical transfer CCDs being disposed adjacent to each associated column of photosensitive cells and having a plurality of stages, each stage of the vertical transfer CCDs receiving an electric charge from each associated photosensitive cell at a predetermined timing;

a horizontal transfer CCD having a plurality of stages, each stage being coupled to one of the columns of the vertical transfer CCDs and receiving the electric charge from the vertical transfer CCDs;

a drain region disposed adjacent the horizontal transfer CCD;

a plurality of drain gates provided between the horizontal transfer CCD and the drain region, each drain gate transferring the electric charge from the horizontal transfer CCD to the drain region;

a drive circuit, the drive circuit providing drive signals to the vertical transfer CCDs, the horizontal transfer CCD and the drain gates for controlling operations thereof;

a processing circuit for receiving an output of the horizontal transfer CCD and providing a standard video signal, the standard video signal having a series of field periods, each field period having a predetermined number of horizontal periods;

a re-arranging circuit receiving the standard video signal from the processing circuit and re-arranging the signal arrangement of the standard video signal to provide an output signal having P pictures, P being greater than or equal to 2;

a select means receiving the output signal from the re-arranging circuit and selecting at least one picture and less than all pictures from the P pictures and discarding all other unselected pictures of the P pictures; and a view finder receiving an output of the select means to display the at least one picture and less than all pictures selected at the select means during recording of the slow motion pictures, wherein a variable natural number M and a variable natural number L, and a product of M and L is equal to a variable slow motion ratio N;

wherein a natural number K is equal to the number of the plurality of stages of the vertical transfer CCDs;

wherein the electric charge transfer from the photosensitive array to the vertical transfer CCDs is achieved N times in one field period;

wherein the electric charge transfer from the vertical transfer CCDs to the horizontal transfer CCD is achieved M times in one horizontal period, and K/L times of the electric charge is transferred from the vertical transfer CCDs to the horizontal transfer CCD is achieved after each electric charge transfer from the photosensitive array to the vertical transfer CCDs;

wherein the electric charge remaining in the horizontal transfer CCD is transferred to the drain region before each electric charge transfer from the vertical transfer CCDs array to the horizontal transfer CCD; and wherein after K/L times of the electric charge is transferred from the vertical transfer CCDs to the horizontal transfer CCD, the electric charge remaining in the vertical transfer CCDs is transferred to the horizontal transfer CCD and then to the drain region by (1−1/L)×K times of electric charge transfer from the vertical transfer CCDs to the horizontal transfer CCD and then from the horizontal transfer CCD to the drain region before each electric charge transfer from the photosensitive array to the vertical transfer CCDs.

2. An imaging device for recording slow motion pictures as claimed in claim 1, wherein the selecting means is an interpolating circuit receiving the output signal from the re-arranging circuit and interpolating P pictures in the vertical and the horizontal direction.

3. An imaging device for recording slow motion pictures, comprising:

- a photosensitive imaging surface having a vertical direction and a horizontal direction perpendicular to the vertical direction;
- a drive circuit providing drive signals to the photosensitive imaging surface for controlling operations of the photosensitive imaging surface;
- a processing circuit for receiving an output of the photosensitive imaging surface and providing a standard video signal in response to the drive signals of the drive circuit, the standard video signal having a series of field periods, each field period having a predetermined number of horizontal periods;
- a re-arranging circuit receiving the standard video signal from the processing circuit and re-arranging the signal arrangement of the standard video signal to provide an output signal having P pictures, P being equal greater than or equal to 2;
- a select means receiving the output signal from the re-arranging circuit and selecting at least one picture and less than all pictures from the P pictures; and
- a view finder receiving an output of the select means to display the at least one picture and less than all pictures selected at the select means during recording of the slow motion pictures,
- wherein a variable natural number M and a variable natural number L, and a product of M and L id equal to a variable slow motion ratio N; and
- wherein P pictures equals N.

4. An imaging device for recording slow motion pictures as claimed in claim 3, wherein the selecting means is an interpolating circuit receiving the output signal from the re-arranging circuit and interpolating the P pictures in the vertical and the horizontal direction.

\* \* \* \* \*